United States Patent Office 2,973,222
Patented Feb. 28, 1961

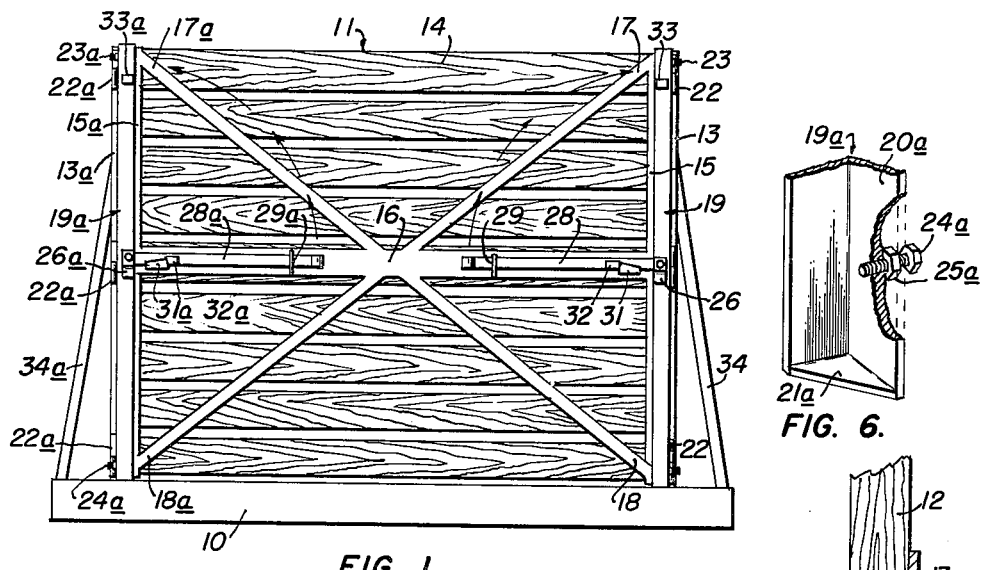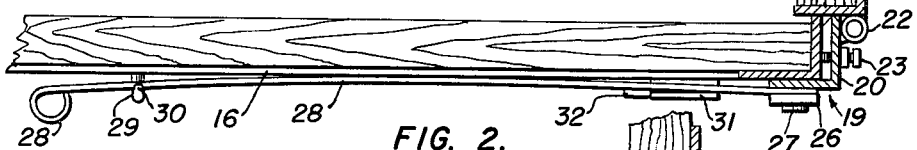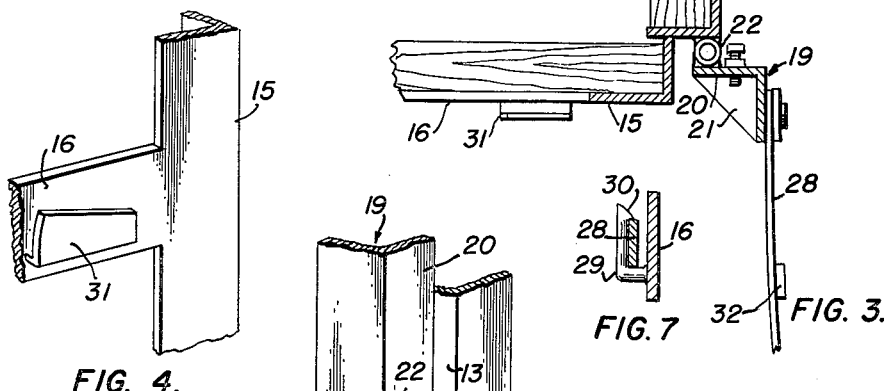

2,973,222
TAIL GATE

Dixie L. Ellzey, Box 393, Forestburg, Tex., and William M. Gibson, South Star Rte., St. Jo, Tex.

Filed Feb. 4, 1960, Ser. No. 6,747

5 Claims. (Cl. 296—53)

This invention relates to tail gates for trucks, trailers, and the like, and has reference to a doubly hinged mounting and latching construction for tail gates whereby the same may be opened from either side of a hauling bed or may be entirely removed therefrom.

Loading facilities for trucks and trailers are not uniform throughout the country. Some livestock loading chutes, for instance, are equipped with gates which swing from the right whereas chutes at other localities may be equipped with gates which swing from the left. Where a single vehicle is to be used for hauling stock to and from a number of diverse loading docks and chutes, it is advantageous to have the vehicle equipped with a tail gate which can be opened from either side or which, as a third alternative, may easily be removed from the vehicle. It is important, in the construction of such a tail gate, that disengagement of either side should not entail the use of special tools and should not require manipulations beyond the periphery of the bed and side panels of the vehicle. An easily operated and centrally located latch bar mechanism would have the advantage of superior accessibility in loading areas of varying construction and a familiar form of construction for simple operation by employees at various facilities.

Heretofore, the simultaneous requirements of strength to resist load pressure resistance to disengagement by road vibration, and the need for economical construction have been deterrents to the development and use of doubly hinged tail gates.

Accordingly, an object of the present invention is to provide a tail gate which may be opened from either side or which may easily be removed from a truck or trailer.

Another object of the invention is to provide a latch mechanism for a doubly hinged tail gate which may be used to secure the tail gate against load pressures.

A further object is to provide a latch mechanism not susceptible to disengagement by road vibrations.

A particular object of the invention is to provide a tail gate which may be pivotally opened from either end and which may be held in adjustable stress between hinged mountings.

An additional object of the invention is to provide a doubly hinged tail gate which may be alternately opened from either side or removed altogether by selective manipulation of latch bar mechanisms.

These and other objects will become apparent from the following description and the accompanying drawing, wherein:

Figure 1 is a rear elevational view of a trailer bed with the invention attached thereto in closed position.

Figure 2 is a fragmentary plan view of the invention in closed and latched position.

Figure 3 is a fragmentary plan view of the invention in closed but unlatched position.

Figure 4 is a perspective view of a central strap and stationary wedge of the invention.

Figure 5 is a fragmentary perspective view of a side hinge and corner box.

Figure 6 is a perspective view of a corner box and set screw of the invention.

Figure 7 is a partially sectional transverse view of a latch bar, hook and central strap of the invention.

In the drawing, the bed and tail gate of a truck or trailer are respectively designated by the numerals 10 and 11. With particular reference to Figure 1, it will be noted that members supported by the bed 10 and associated with the tail gate 11 are constructed and arranged symmetrically so that each part at one side thereof corresponds to a part at the opposite side and differs therefrom only as the right hand differs from the left. Accordingly, corresponding parts are designated by like numerals, and those members located on the left side of the bed 10 are identified by the suffix "a."

A side panel 12 is disposed perpendicularly to the bed 10 and extends longitudinally thereon at a position spaced inwardly of the right side edge of the bed. A vertical corner post 13 constitutes the rearward edge of the side panel and is secured at its lower end to the bed 10. In the illustrated embodiment of the invention the corner post 13 is shown as a vertically disposed angle iron adjacently covering the outer rear corner of the side panel 12.

The tail gate 11 is constructed of a plurality of vertically spaced horizontal slats 14, each secured at its opposite ends to vertical frame members 15 and 15a which are constructed as angle irons respectively covering the rearward corners of the ends of the several slats 14. A central strap 16 extends horizontally between the vertical frame members 15 and 15a adjacent the rearward side of the tail gate 11, and diagonal straps 17, 17a, 18 and 18a extend from the central strap at the approximate center of the tail gate to the ends of the vertical frame members.

A corner box 19 consisting of a vertically disposed angle member 20 having triangular plates 21 welded to and covering its opposite ends, is pivotally connected to the corner post 13 by hinges 22. The length of the angle member 20 and the spacing of the triangular plates 21 of the corner box 19 are adapted to accommodate a frame member 15 of the tail gate. The mounting of the corner box 19 on the hinges 22 is such that the corner box may be pivoted horizontally to a position where the forward portion of the angle member 20 is perpendicular to the forward portion of the frame member 15 and is laterally spaced therefrom. Upper and lower pressure bolts 23 and 24 positioned respectively beneath and above the upper and lower triangular plates 19 project inwardly through and threadedly engage the forward wall of the corner box. A locking nut 25 threadedly engages each bolt exteriorly of the corner box 17.

The lower portion of a strap bracket 26 is welded to the exterior surface of the rearward portion of the corner box 19 and the upper portion of the bracket is offset from but parallel with that surface. A pivot pin 27 is secured to the offset portion of the strap bracket 26 and projects horizontally into the space between the upper portion thereof and the corner box 19.

A latch bar 28 fabricated of spring steel is journaled at its outer end to the pivot pin 27 and is rearwardly looped at its inner end to provide a handle. An upwardly facing hook 29 is attached to the central strap 16 outwardly of the inner end of the latch bar 28 and a forwardly directed catch 30 is integrally formed with the upper portion of the hook. The latch bar 28 is rearwardly cambered so that it is held by its own spring tension within the hook 29 when it is positioned therein beneath the catch 30. A check block 31 is welded to the rearward surface of the central strap 16 of the tail gate 11 at a position thereon between the hook 29 and the frame member 15. The upper portion of the check block 31 is parallel with and spaced from the central strap 16 and is shaped as a truncated sector of a disc coaxial with the pivot pin 27. A side pawl 32 is welded to the rearward surface of the latch bar 28 to the left of and adjacent the check block 31, and the surface of the side pawl in adjacence with the check block is also formed as an arc generated from the axis of the pivot pin 27.

In corresponding construction, a corner box 19a is hingedly connected to the corner post 13a on the left side of the bed 10 and a latch bar 28a extends from pivotal connection to a strap bracket 26a on the angle member 20a to a hook 29a on the central strap 16. Likewise, a check block 31a and a side pawl 32a having laterally adjacent arcuate surfaces are respectively secured to the central strap 16 and the latch bar 28a. Pressure bolts 23a project inwardly through and threadedly engage the forward portion of the angle member 20a of the corner box 19a.

Spring catches 33 and 33a are secured to the rearward surface of the upper portion of the corner box 19 and 19a and are adapted to receive and hold the respective latch bars 28 and 28a in a vertical position.

In operation, the frame members 15 and 15a of the tail gate 10 are placed within the corner boxes 19 and 19a and the latch bars 28 and 28a are placed within the hooks 29 and 29a. The bolts 23 and 23a are tightened until the check blocks 31 and 31a and the side pawls 32 and 32a are driven into engagement with one another; such tightening or relative adjustment may be used to equalize the force between sets of check blocks and side pawls at opposite sides of the tail gate 11 and tends to place diagonal bracing members 34 and 34a of the side panels 12 and 12a in slight compression. When the tail gate is to be opened to the right (with reference to Figure 1), the latch bar 28a on the left side thereof is removed from its hook 29a and placed in its spring catch 33a. The left side of the tail gate 11 is then pulled rearwardly and disengaged from the left corner box 19a which pivots rearwardly and to the left. The check block 31 and side pawl 32 on the right confine the right frame member 15 to the right corner box 19, and the tail gate 11, so confined, pivots rearwardly and to the right on the hinges 22 of the corner box. The tail gate 11 may be correspondingly opened to the left by replacement of the left latch bar 28a in its hook 29a and disengagement of the right latch bar 28 from its hook 29. The tail gate may be removed altogether upon disengagement of both latch bars 28 and 28a from the hooks 29 and 29a.

The invention is not limited to the exemplary construction herein shown and described, but may be made in various ways within the scope of the appended claims.

What is claimed is:

1. In a hauling bed, a first corner box hingedly connected to one rear vertical edge of a side panel of said hauling bed, a second corner box hingedly connected to the rear vertical edge of the other side panel of said hauling bed, a tail gate having its lateral ends adapted to be received simultaneously in said corner boxes, a pair of hooks mounted on said tail gate, a pair of latch bars respectively pivotally mounted on said corner boxes and adapted to be respectively received in said hooks, a pawl mounted on each latch bar, and check blocks mounted on said tail gate in interlocking engagement with said pawls on said latch bars.

2. In a hauling bed, a first corner box hingedly connected to one rear vertical edge of a side panel of said hauling bed, a second corner box hingedly connected to the rear vertical edge of the other side panel of said hauling bed, a tail gate having its lateral ends adapted to be received simultaneously in said corner boxes, a pair of latch bars respectively pivotally connected to said corner boxes, a pair of hooks attached to said tail gate and adapted to respectively receive said latch bars, a catch on each hook adapted to secure a said latch bar therein, a pawl secured to each latch bar, a pair of check blocks secured to said tail gate and adapted for engagement with said pawls on said latch bars, bolts threadedly engaging said corner boxes in opposed relationship to said lateral ends of said tail gate, and locking nuts threadedly engaging said bolts.

3. In a hauling bed including side panels, a vertically disposed first angle member hingedly connected to one side panel of said hauling bed, a plate attached to and covering the lower end of said first angle member, a vertically disposed second angle member hingedly connected to the other side panel of said hauling bed, a plate attached to and covering the lower end of said second angle member, a tail gate having ends adapted to be received in said angle members and upon said plates, latch bars respectively pivotally connected to said angle members, hooks in said tail gate adapted to respectively receive said latch bars, a pawl mounted on each latch bar, check blocks on said tail gate adapted for interlocking engagement with said pawls on said latch bars, and adjustable means urging said pawls on said latch bars against said check blocks on said tail gate.

4. The invention as defined in claim 3 and wherein said adjustable means urging said pawls on said latch bars against said check blocks on said tail gate includes bolts threadedly engaging said angle members and bearing on said ends of said tail gate.

5. The invention as defined in claim 3 and including catches respectively formed in said hooks and adapted to retain said latch bars within said hooks.

References Cited in the file of this patent

UNITED STATES PATENTS

| | | |
|---|---|---|
| 582,805 | Boulton | May 18, 1897 |
| 624,756 | Crisler | May 9, 1899 |
| 864,692 | Roberts | Aug. 27, 1907 |
| 1,454,179 | Moothart | May 8, 1923 |